United States Patent
Wood et al.

(10) Patent No.: US 9,733,349 B1
(45) Date of Patent: Aug. 15, 2017

(54) SYSTEM FOR AND METHOD OF RADAR DATA PROCESSING FOR LOW VISIBILITY LANDING APPLICATIONS

(71) Applicants: Robert B. Wood, Beaverton, OR (US); Carlo L. Tiana, Portland, OR (US); Nathaniel S. Kowash, Portland, OR (US); Richard D. Jinkins, Rewey, WI (US); Richard M. Rademaker, Cedar Rapids, IA (US)

(72) Inventors: Robert B. Wood, Beaverton, OR (US); Carlo L. Tiana, Portland, OR (US); Nathaniel S. Kowash, Portland, OR (US); Richard D. Jinkins, Rewey, WI (US); Richard M. Rademaker, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 384 days.

(21) Appl. No.: 14/482,681

(22) Filed: Sep. 10, 2014

(51) Int. Cl.
*G01S 13/95* (2006.01)
*G01S 13/02* (2006.01)

(52) U.S. Cl.
CPC .......... *G01S 13/02* (2013.01); *G01S 13/953* (2013.01)

(58) Field of Classification Search
CPC .............................. G01S 13/02; G01S 13/953
USPC ......... 342/26 R, 26 A–26 D, 33–37, 52, 182
See application file for complete search history.

(56) References Cited

U.S. PATENT DOCUMENTS

| | | |
|---|---|---|
| 2,416,155 A | 2/1947 | Chubb |
| 2,849,184 A | 8/1958 | Arden et al. |
| 2,929,059 A | 3/1960 | Parker |
| 2,930,035 A | 3/1960 | Altekruse |
| 2,948,892 A | 8/1960 | White |
| 2,965,894 A | 12/1960 | Sweeney |
| 2,994,966 A | 8/1961 | Senitsky et al. |
| 3,031,660 A | 4/1962 | Young |
| 3,049,702 A | 8/1962 | Schreitmueller |
| 3,064,252 A | 11/1962 | Varela |
| 3,070,795 A | 12/1962 | Chambers |
| 3,071,766 A | 1/1963 | Fenn |
| 3,072,903 A | 1/1963 | Meyer |

(Continued)

FOREIGN PATENT DOCUMENTS

| | | | |
|---|---|---|---|
| DE | 196 49 838 | 4/1998 | |
| DE | 19949737 A1 * | 4/2001 | ............... B64F 1/20 |

(Continued)

OTHER PUBLICATIONS

Airports Authority of India, Chapter 7: Visual Aids for Navigation—Lights, available prior to Jan. 1, 2005, retrieved from the internet at: http://www.aai.aero/aai_employees/chapter_7.pdf on Sep. 26, 2014, 33 pages.

(Continued)

*Primary Examiner* — John B Sotomayor
(74) *Attorney, Agent, or Firm* — Donna P. Suchy; Daniel M. Barbieri

(57) ABSTRACT

An apparatus is for use with an aircraft radar system having a radar antenna. The apparatus comprises processing electronics are configured to receive radar data associated with the radar antenna of the system. The processing electronics are also configured to detect periodic data associated with runway lights in the radar data.

20 Claims, 4 Drawing Sheets

(56) References Cited

U.S. PATENT DOCUMENTS

| | | |
|---|---|---|
| 3,089,801 A | 5/1963 | Tierney et al. |
| 3,107,351 A | 10/1963 | Milam |
| 3,113,310 A | 12/1963 | Standing |
| 3,129,425 A | 4/1964 | Sanner |
| 3,153,234 A | 10/1964 | Begeman et al. |
| 3,175,215 A | 3/1965 | Blasberg et al. |
| 3,212,088 A | 10/1965 | Alexander et al. |
| 3,221,328 A | 11/1965 | Walter |
| 3,241,141 A | 3/1966 | Wall |
| 3,274,593 A | 9/1966 | Varela et al. |
| 3,325,807 A | 6/1967 | Burns et al. |
| 3,334,344 A | 8/1967 | Colby, Jr |
| 3,339,199 A | 8/1967 | Pichafroy |
| 3,373,423 A | 3/1968 | Levy |
| 3,397,397 A | 8/1968 | Barney |
| 3,448,450 A | 6/1969 | Alfandari et al. |
| 3,618,090 A | 11/1971 | Garrison |
| 3,680,094 A | 7/1972 | Bayle et al. |
| 3,716,855 A | 2/1973 | Asam |
| 3,739,380 A | 6/1973 | Burdic et al. |
| 3,781,878 A | 12/1973 | Kirkpatrick |
| 3,810,175 A | 5/1974 | Bell |
| 3,815,132 A | 6/1974 | Case et al. |
| 3,816,718 A | 6/1974 | Hall et al. |
| 3,851,758 A | 12/1974 | Makhijani et al. |
| 3,866,222 A | 2/1975 | Young |
| 3,885,237 A | 5/1975 | Kirkpatrick |
| 3,956,749 A | 5/1976 | Magorian |
| 4,024,537 A | 5/1977 | Hart |
| 4,058,701 A | 11/1977 | Gruber et al. |
| 4,058,710 A | 11/1977 | Altmann |
| 4,063,218 A | 12/1977 | Basov et al. |
| 4,103,300 A * | 7/1978 | Gendreu ............. G01S 13/4472 342/149 |
| 4,235,951 A | 11/1980 | Swarovski |
| 4,277,845 A | 7/1981 | Smith et al. |
| 4,405,986 A | 9/1983 | Gray |
| 4,435,707 A | 3/1984 | Clark |
| 4,481,519 A | 11/1984 | Margerum |
| 4,532,515 A | 7/1985 | Cantrell et al. |
| 4,594,676 A | 6/1986 | Breiholz et al. |
| 4,595,925 A | 6/1986 | Hansen |
| 4,598,292 A | 7/1986 | Devino |
| 4,628,318 A | 12/1986 | Alitz |
| 4,646,244 A | 2/1987 | Bateman et al. |
| 4,649,388 A | 3/1987 | Atlas |
| 4,654,665 A | 3/1987 | Kiuchi et al. |
| 4,685,149 A | 8/1987 | Smith et al. |
| 4,760,396 A | 7/1988 | Barney et al. |
| 4,828,382 A | 5/1989 | Vermilion |
| 4,843,398 A | 6/1989 | Houston et al. |
| 4,912,477 A | 3/1990 | Lory et al. |
| 4,914,436 A | 4/1990 | Bateman et al. |
| 4,924,401 A | 5/1990 | Bice et al. |
| 4,939,513 A | 7/1990 | Paterson et al. |
| 4,951,059 A | 8/1990 | Taylor, Jr. |
| 4,953,972 A | 9/1990 | Zuk |
| 4,965,573 A | 10/1990 | Gallagher et al. |
| 4,987,419 A | 1/1991 | Salkeld |
| 5,045,855 A | 9/1991 | Moreira |
| 5,047,779 A | 9/1991 | Hager |
| 5,047,781 A | 9/1991 | Bleakney |
| 5,049,886 A | 9/1991 | Seitz et al. |
| 5,166,688 A | 11/1992 | Moreira |
| 5,173,703 A | 12/1992 | Mangiapane et al. |
| 5,175,554 A | 12/1992 | Mangiapane et al. |
| 5,198,819 A | 3/1993 | Susnjara |
| 5,202,690 A | 4/1993 | Frederick |
| 5,247,303 A | 9/1993 | Cornelius et al. |
| 5,273,553 A | 12/1993 | Hoshi et al. |
| 5,311,183 A | 5/1994 | Mathews et al. |
| 5,329,391 A | 7/1994 | Miyamoto et al. |
| 5,332,998 A | 7/1994 | Avignon et al. |
| 5,345,241 A | 9/1994 | Huddle |
| 5,365,356 A | 11/1994 | McFadden |
| 5,383,457 A | 1/1995 | Cohen |
| 5,442,364 A | 8/1995 | Lee et al. |
| 5,530,440 A * | 6/1996 | Danzer ..................... G01S 1/68 340/933 |
| 5,539,409 A | 7/1996 | Mathews et al. |
| 5,559,515 A | 9/1996 | Alimena et al. |
| 5,559,518 A | 9/1996 | DiDomizio |
| 5,566,840 A | 10/1996 | Waldner et al. |
| 5,592,178 A | 1/1997 | Chang et al. |
| 5,678,303 A | 10/1997 | Wichmann |
| 5,736,957 A | 4/1998 | Raney |
| 5,820,080 A | 10/1998 | Eschenbach |
| 5,828,332 A | 10/1998 | Frederick |
| 5,831,570 A | 11/1998 | Ammar et al. |
| 5,839,080 A | 11/1998 | Muller et al. |
| 5,867,119 A | 2/1999 | Corrubia et al. |
| 5,894,286 A | 4/1999 | Morand et al. |
| 5,918,517 A | 7/1999 | Malapert et al. |
| 5,920,276 A | 7/1999 | Frederick |
| 5,923,279 A | 7/1999 | Bamler et al. |
| 5,936,575 A | 8/1999 | Azzarelli et al. |
| 5,942,062 A | 8/1999 | Hassall et al. |
| 5,945,926 A | 8/1999 | Ammar et al. |
| 5,950,512 A | 9/1999 | Fields |
| 5,959,762 A | 9/1999 | Bandettini et al. |
| 5,978,715 A | 11/1999 | Briffe et al. |
| 6,002,347 A | 12/1999 | Daly et al. |
| 6,023,240 A | 2/2000 | Sutton |
| 6,061,016 A | 5/2000 | Lupinski et al. |
| 6,061,022 A | 5/2000 | Menegozzi et al. |
| 6,064,942 A | 5/2000 | Johnson et al. |
| 6,075,484 A | 6/2000 | Daniel et al. |
| 6,092,009 A | 7/2000 | Glover |
| 6,112,141 A | 8/2000 | Briffe et al. |
| 6,112,570 A | 9/2000 | Hruschak |
| 6,122,570 A | 9/2000 | Muller et al. |
| 6,127,944 A | 10/2000 | Daly et al. |
| 6,128,066 A | 10/2000 | Yokozeki |
| 6,128,553 A | 10/2000 | Gordon et al. |
| 6,138,060 A | 10/2000 | Conner et al. |
| 6,150,901 A | 11/2000 | Auken |
| 6,154,151 A | 11/2000 | McElreath et al. |
| 6,154,169 A | 11/2000 | Kuntman |
| 6,157,339 A | 12/2000 | Sato et al. |
| 6,157,891 A | 12/2000 | Lin |
| 6,163,021 A | 12/2000 | Mickelson |
| 6,166,661 A | 12/2000 | Anderson et al. |
| 6,169,770 B1 | 1/2001 | Henely |
| 6,178,391 B1 | 1/2001 | Anderson et al. |
| 6,184,816 B1 | 2/2001 | Zheng et al. |
| 6,188,330 B1 | 2/2001 | Glover |
| 6,194,980 B1 | 2/2001 | Thon |
| 6,199,008 B1 | 3/2001 | Aratow et al. |
| 6,201,494 B1 | 3/2001 | Kronfeld |
| 6,204,806 B1 | 3/2001 | Hoech |
| 6,205,400 B1 | 3/2001 | Lin |
| 6,208,284 B1 | 3/2001 | Woodell et al. |
| 6,219,592 B1 | 4/2001 | Muller et al. |
| 6,233,522 B1 | 5/2001 | Morici |
| 6,236,351 B1 | 5/2001 | Conner et al. |
| 6,259,400 B1 | 7/2001 | Higgins et al. |
| 6,266,114 B1 | 7/2001 | Skarohlid |
| 6,278,799 B1 | 8/2001 | Hoffman |
| 6,281,832 B1 | 8/2001 | McElreath |
| 6,285,298 B1 | 9/2001 | Gordon |
| 6,285,337 B1 | 9/2001 | West et al. |
| 6,285,926 B1 | 9/2001 | Weiler et al. |
| 6,289,277 B1 | 9/2001 | Feyereisen et al. |
| 6,311,108 B1 | 10/2001 | Ammar et al. |
| 6,317,468 B1 | 11/2001 | Meyer |
| 6,317,690 B1 | 11/2001 | Gia |
| 6,317,872 B1 | 11/2001 | Gee et al. |
| 6,340,946 B1 | 1/2002 | Wolfson et al. |
| 6,345,127 B1 | 2/2002 | Mitchell |
| 6,359,585 B1 | 3/2002 | Bechman et al. |
| 6,366,013 B1 | 4/2002 | Leenders et al. |
| 6,373,418 B1 | 4/2002 | Abbey |
| 6,374,286 B1 | 4/2002 | Gee et al. |
| 6,377,202 B1 | 4/2002 | Kropfli et al. |

(56) References Cited

U.S. PATENT DOCUMENTS

| | | |
|---|---|---|
| 6,377,892 B1 | 4/2002 | Johnson et al. |
| 6,388,607 B1 | 5/2002 | Woodell |
| 6,388,608 B1 | 5/2002 | Woodell et al. |
| 6,388,724 B1 | 5/2002 | Campbell et al. |
| 6,389,354 B1 | 5/2002 | Hicks et al. |
| 6,401,038 B2 | 6/2002 | Gia |
| 6,411,890 B1 | 6/2002 | Zimmerman |
| 6,421,000 B1 | 7/2002 | McDowell |
| 6,421,603 B1 | 7/2002 | Pratt et al. |
| 6,424,288 B1 | 7/2002 | Woodell |
| 6,426,717 B1 | 7/2002 | Maloratsky |
| 6,426,720 B1 | 7/2002 | Ross et al. |
| 6,427,122 B1 | 7/2002 | Lin |
| 6,441,773 B1 | 8/2002 | Kelly et al. |
| 6,445,310 B1 | 9/2002 | Bateman et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,456,238 B1 | 9/2002 | Posey |
| 6,462,703 B2 | 10/2002 | Hedrick |
| 6,473,026 B1 | 10/2002 | Ali-Mehenni et al. |
| 6,473,037 B2 | 10/2002 | Vail et al. |
| 6,473,240 B1 | 10/2002 | Dehmlow |
| 6,481,482 B1 | 11/2002 | Shimotomai |
| 6,492,934 B1 | 12/2002 | Hwang et al. |
| 6,501,424 B1 | 12/2002 | Haendel et al. |
| 6,512,476 B1 | 1/2003 | Woodell |
| 6,512,527 B1 | 1/2003 | Barber et al. |
| 6,516,272 B2 | 2/2003 | Lin |
| 6,516,283 B2 | 2/2003 | McCall et al. |
| 6,520,056 B1 | 2/2003 | Nemeth et al. |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,590,528 B1 | 7/2003 | DeWulf |
| 6,591,171 B1 | 7/2003 | Ammar et al. |
| 6,593,875 B2 | 7/2003 | Bergin et al. |
| 6,600,443 B2 | 7/2003 | Landt |
| 6,603,425 B1 | 8/2003 | Woodell |
| 6,614,057 B2 | 9/2003 | Silvernail et al. |
| 6,650,275 B1 | 11/2003 | Kelly et al. |
| 6,650,291 B1 | 11/2003 | West et al. |
| 6,653,947 B2 | 11/2003 | Dwyer et al. |
| 6,667,710 B2 | 12/2003 | Cornell et al. |
| 6,681,668 B1 | 1/2004 | Smirle |
| 6,690,298 B1 | 2/2004 | Barber et al. |
| 6,690,299 B1 | 2/2004 | Suiter |
| 6,690,317 B2 | 2/2004 | Szeto et al. |
| 6,697,008 B1 | 2/2004 | Sternowski |
| 6,697,012 B2 | 2/2004 | Lodwig et al. |
| 6,710,663 B1 | 3/2004 | Berquist |
| 6,714,186 B1 | 3/2004 | Mosier et al. |
| 6,720,890 B1 * | 4/2004 | Ezroni ................. G08G 5/0013 340/945 |
| 6,724,344 B1 | 4/2004 | Stockmaster et al. |
| 6,731,236 B1 | 5/2004 | Hager et al. |
| 6,738,011 B1 | 5/2004 | Evans |
| 6,739,929 B2 | 5/2004 | Furukawa et al. |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,760,155 B2 | 7/2004 | Murayama et al. |
| 6,771,626 B1 | 8/2004 | Golubiewski et al. |
| 6,782,392 B1 | 8/2004 | Weinberger et al. |
| 6,799,095 B1 | 9/2004 | Owen et al. |
| 6,803,245 B2 | 10/2004 | Auch et al. |
| 6,804,614 B1 | 10/2004 | McGraw et al. |
| 6,806,846 B1 | 10/2004 | West |
| 6,807,538 B1 | 10/2004 | Weinberger et al. |
| 6,813,777 B1 | 11/2004 | Weinberger et al. |
| 6,819,983 B1 | 11/2004 | McGraw |
| 6,822,617 B1 | 11/2004 | Mather et al. |
| 6,825,804 B1 | 11/2004 | Doty |
| 6,832,538 B1 | 12/2004 | Hwang |
| 6,839,017 B1 | 1/2005 | Dillman |
| 6,842,288 B1 | 1/2005 | Liu et al. |
| 6,850,185 B1 | 2/2005 | Woodell |
| 6,862,323 B1 | 3/2005 | Loper |
| 6,862,501 B2 | 3/2005 | He |
| 6,865,452 B2 | 3/2005 | Burdon |
| 6,879,280 B1 | 4/2005 | Bull et al. |
| 6,879,886 B2 | 4/2005 | Wilkins et al. |
| 6,882,302 B1 | 4/2005 | Woodell et al. |
| 6,908,202 B2 | 6/2005 | Graf et al. |
| 6,917,396 B2 | 7/2005 | Hiraishi et al. |
| 6,918,134 B1 | 7/2005 | Sherlock et al. |
| 6,933,885 B1 | 8/2005 | Stockmaster et al. |
| 6,938,258 B1 | 8/2005 | Weinberger et al. |
| 6,950,062 B1 | 9/2005 | Mather et al. |
| 6,959,057 B1 | 10/2005 | Tuohino |
| 6,972,727 B1 | 12/2005 | West et al. |
| 6,977,608 B1 | 12/2005 | Anderson et al. |
| 6,984,545 B2 | 1/2006 | Grigg et al. |
| 6,990,022 B2 | 1/2006 | Morikawa et al. |
| 6,992,614 B1 | 1/2006 | Joyce |
| 6,995,726 B1 | 2/2006 | West et al. |
| 6,998,648 B2 | 2/2006 | Silvernail |
| 6,998,908 B1 | 2/2006 | Sternowski |
| 6,999,022 B1 | 2/2006 | Vesel et al. |
| 6,999,027 B1 | 2/2006 | Stockmaster |
| 7,002,546 B1 | 2/2006 | Stuppi et al. |
| 7,010,398 B2 | 3/2006 | Wilkins et al. |
| 7,023,375 B2 | 4/2006 | Klausing et al. |
| 7,026,956 B1 | 4/2006 | Wenger et al. |
| 7,028,304 B1 | 4/2006 | Weinberger et al. |
| 7,030,945 B2 | 4/2006 | Umemoto et al. |
| 7,034,753 B1 | 4/2006 | Elsallal et al. |
| 7,042,387 B2 | 5/2006 | Ridenour et al. |
| 7,053,796 B1 | 5/2006 | Barber |
| 7,057,549 B2 | 6/2006 | Block |
| 7,064,680 B2 | 6/2006 | Reynolds et al. |
| 7,069,120 B1 | 6/2006 | Koenck et al. |
| 7,089,092 B1 | 8/2006 | Wood et al. |
| 7,092,645 B1 | 8/2006 | Sternowski |
| 7,098,913 B1 | 8/2006 | Etherington et al. |
| 7,109,912 B1 | 9/2006 | Paramore et al. |
| 7,109,913 B1 | 9/2006 | Paramore et al. |
| 7,123,260 B2 | 10/2006 | Brust |
| 7,129,885 B1 | 10/2006 | Woodell et al. |
| 7,145,501 B1 | 12/2006 | Manfred et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,170,959 B1 | 1/2007 | Abbey |
| 7,180,476 B1 | 2/2007 | Guell et al. |
| 7,191,406 B1 | 3/2007 | Barber et al. |
| 7,196,329 B1 * | 3/2007 | Wood ................. G01C 7/00 250/330 |
| 7,205,933 B1 | 4/2007 | Snodgrass |
| 7,209,070 B2 | 4/2007 | Gilliland et al. |
| 7,212,216 B2 | 5/2007 | He et al. |
| 7,218,268 B2 | 5/2007 | VandenBerg |
| 7,219,011 B1 | 5/2007 | Barber |
| 7,242,343 B1 | 7/2007 | Woodell |
| 7,242,345 B2 | 7/2007 | Raestad et al. |
| 7,250,903 B1 | 7/2007 | McDowell |
| 7,265,710 B2 | 9/2007 | DeAgro |
| 7,269,657 B1 | 9/2007 | Alexander et al. |
| 7,272,472 B1 | 9/2007 | McElreath |
| 7,273,403 B2 | 9/2007 | Yokota et al. |
| 7,280,068 B2 | 10/2007 | Lee et al. |
| 7,289,058 B2 | 10/2007 | Shima |
| 7,292,178 B1 | 11/2007 | Woodell et al. |
| 7,292,180 B2 | 11/2007 | Schober |
| 7,295,150 B2 | 11/2007 | Burlet et al. |
| 7,295,901 B1 | 11/2007 | Little et al. |
| 7,301,496 B2 | 11/2007 | Honda et al. |

(56) References Cited

U.S. PATENT DOCUMENTS

| | | |
|---|---|---|
| 7,307,576 B1 | 12/2007 | Koenigs |
| 7,307,577 B1 | 12/2007 | Kronfeld et al. |
| 7,307,583 B1 | 12/2007 | Woodell et al. |
| 7,312,725 B2 | 12/2007 | Berson et al. |
| 7,312,743 B2 | 12/2007 | Ridenour et al. |
| 7,317,427 B2 | 1/2008 | Pauplis et al. |
| 7,321,332 B2 | 1/2008 | Focke et al. |
| 7,337,043 B2 | 2/2008 | Bull |
| 7,349,154 B2 | 3/2008 | Aiura et al. |
| 7,352,292 B2 | 4/2008 | Alter et al. |
| 7,361,240 B2 | 4/2008 | Kim |
| 7,372,394 B1 | 5/2008 | Woodell et al. |
| 7,373,223 B2 | 5/2008 | Murphy |
| 7,375,678 B2 | 5/2008 | Feyereisen et al. |
| 7,379,014 B1 | 5/2008 | Woodell et al. |
| 7,379,796 B2 | 5/2008 | Walsdorf et al. |
| 7,381,110 B1 | 6/2008 | Sampica et al. |
| 7,417,578 B1 | 8/2008 | Woodell et al. |
| 7,417,579 B1 | 8/2008 | Woodell |
| 7,423,578 B1 | 9/2008 | Tietjen |
| 7,446,697 B2 | 11/2008 | Burlet et al. |
| 7,446,938 B2 | 11/2008 | Miyatake et al. |
| 7,452,258 B1 | 11/2008 | Marzen et al. |
| 7,474,262 B2 | 1/2009 | Alland |
| 7,479,920 B2 | 1/2009 | Niv |
| 7,486,220 B1 | 2/2009 | Kronfeld et al. |
| 7,486,291 B2 | 2/2009 | Berson et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,525,448 B1 | 4/2009 | Wilson et al. |
| 7,528,765 B1 | 5/2009 | Woodell et al. |
| 7,528,915 B2 | 5/2009 | Choi et al. |
| 7,541,970 B1 | 6/2009 | Godfrey et al. |
| 7,541,971 B1 | 6/2009 | Woodell et al. |
| 7,551,451 B2 | 6/2009 | Kim et al. |
| 7,557,735 B1 | 7/2009 | Woodell et al. |
| 7,566,254 B2 | 7/2009 | Sampica et al. |
| 7,570,177 B2 | 8/2009 | Reynolds et al. |
| 7,576,680 B1 | 8/2009 | Woodell |
| 7,603,209 B2 | 10/2009 | Dwyer et al. |
| 7,609,200 B1 | 10/2009 | Woodell et al. |
| 7,612,706 B2 | 11/2009 | Honda et al. |
| 7,616,150 B1 | 11/2009 | Woodell |
| 7,633,428 B1 | 12/2009 | McCusker et al. |
| 7,633,430 B1 | 12/2009 | Wichgers et al. |
| 7,633,584 B2 | 12/2009 | Umemoto et al. |
| 7,639,175 B1 | 12/2009 | Woodell |
| 7,664,601 B2 | 2/2010 | Daly, Jr. |
| 7,675,461 B1 | 3/2010 | McCusker et al. |
| 7,693,621 B1 | 4/2010 | Chamas |
| 7,696,921 B1 | 4/2010 | Finley et al. |
| 7,714,767 B1 | 5/2010 | Kronfeld et al. |
| 7,733,264 B1 | 6/2010 | Woodell et al. |
| 7,783,427 B1 | 8/2010 | Woodell et al. |
| 7,783,429 B2 | 8/2010 | Walden et al. |
| 7,791,529 B2 | 9/2010 | Filias et al. |
| 7,808,422 B1 | 10/2010 | Woodell et al. |
| 7,814,676 B2 | 10/2010 | Sampica et al. |
| 7,843,380 B1 | 11/2010 | Woodell |
| 7,859,448 B1 | 12/2010 | Woodell et al. |
| 7,859,449 B1 | 12/2010 | Woodell et al. |
| 7,864,103 B2 | 1/2011 | Weber et al. |
| 7,868,811 B1 | 1/2011 | Woodell et al. |
| 7,872,594 B1 | 1/2011 | Vesel |
| 7,889,117 B1 | 2/2011 | Woodell et al. |
| 7,889,118 B1 | 2/2011 | Finley et al. |
| 7,927,440 B2 | 4/2011 | Matsuhira |
| 7,929,086 B2 | 4/2011 | Toyama et al. |
| 7,965,223 B1 | 6/2011 | Mccusker |
| 7,965,225 B1 | 6/2011 | Dickerson et al. |
| 8,035,547 B1 | 10/2011 | Flanigan et al. |
| 8,038,498 B2 | 10/2011 | Miyauchi et al. |
| 8,045,098 B2 | 10/2011 | Kitagawa et al. |
| 8,059,025 B2 | 11/2011 | D'Addio |
| 8,068,984 B2 | 11/2011 | Smith et al. |
| 8,072,368 B1 | 12/2011 | Woodell |
| 8,077,078 B1 | 12/2011 | Woodell et al. |
| 8,102,487 B2 | 1/2012 | Kitagawa et al. |
| 8,118,075 B2 | 2/2012 | Sampica et al. |
| 8,137,498 B2 | 3/2012 | Sampica et al. |
| 8,140,223 B2 | 3/2012 | Whitehead et al. |
| 8,159,464 B1 | 4/2012 | Gribble et al. |
| 8,232,917 B2 | 7/2012 | Scherzinger et al. |
| 8,296,065 B2 | 10/2012 | Haynie et al. |
| 8,373,580 B2 | 2/2013 | Bunch et al. |
| 8,410,975 B1 | 4/2013 | Bell et al. |
| 8,477,062 B1 | 7/2013 | Kanellis |
| 8,486,535 B1 | 7/2013 | Nemeth et al. |
| 8,493,241 B2 | 7/2013 | He |
| 8,515,600 B1 | 8/2013 | McCusker |
| 8,540,002 B2 | 9/2013 | Sampica et al. |
| 8,558,731 B1 | 10/2013 | Woodell |
| 8,576,112 B2 | 11/2013 | Garrec et al. |
| 8,583,315 B2 | 11/2013 | Whitehead et al. |
| 8,594,879 B2 | 11/2013 | Roberge et al. |
| 8,603,288 B2 | 12/2013 | Sampica et al. |
| 8,634,993 B2 | 1/2014 | Mcclure et al. |
| 8,639,416 B2 | 1/2014 | Jones et al. |
| 8,643,533 B1 | 2/2014 | Woodell et al. |
| 8,691,043 B2 | 4/2014 | Sampica et al. |
| 8,717,226 B2 | 5/2014 | Bon et al. |
| 8,773,301 B1 | 7/2014 | Woodell |
| 8,896,480 B1 | 11/2014 | Wilson et al. |
| 8,909,471 B1 | 12/2014 | Jinkins et al. |
| 8,917,191 B1* | 12/2014 | Tiana .................... G01C 23/00 340/945 |
| 8,936,057 B2 | 1/2015 | Sampica et al. |
| 8,976,042 B1* | 3/2015 | Chiew ................ G08G 5/0021 340/945 |
| 9,354,633 B1 | 5/2016 | McCusker et al. |
| 2001/0050372 A1 | 12/2001 | Krijn et al. |
| 2001/0053648 A1 | 12/2001 | Furukawa et al. |
| 2002/0039070 A1 | 4/2002 | Ververs et al. |
| 2002/0111717 A1 | 8/2002 | Scherzinger et al. |
| 2002/0116125 A1 | 8/2002 | Lin |
| 2002/0116126 A1 | 8/2002 | Lin |
| 2002/0158256 A1 | 10/2002 | Yamada et al. |
| 2002/0179229 A1 | 12/2002 | Chuzles |
| 2002/0185600 A1 | 12/2002 | Kerr |
| 2002/0187284 A1 | 12/2002 | Kinoshita et al. |
| 2003/0021491 A1 | 1/2003 | Brust |
| 2003/0038916 A1 | 2/2003 | Nakano et al. |
| 2003/0043315 A1 | 3/2003 | Umemoto et al. |
| 2003/0071828 A1 | 4/2003 | Wilkins et al. |
| 2003/0089214 A1 | 5/2003 | Fukuta et al. |
| 2003/0093187 A1 | 5/2003 | Walker |
| 2003/0102999 A1 | 6/2003 | Bergin et al. |
| 2003/0156238 A1 | 8/2003 | Hiraishi et al. |
| 2003/0160718 A1 | 8/2003 | Nagasaku |
| 2003/0174396 A1 | 9/2003 | Murayama et al. |
| 2003/0180528 A1 | 9/2003 | Flosenzier et al. |
| 2003/0189606 A1 | 10/2003 | Moon et al. |
| 2003/0195672 A1 | 10/2003 | He |
| 2003/0216859 A1 | 11/2003 | Martell et al. |
| 2003/0222887 A1 | 12/2003 | Wilkins et al. |
| 2004/0044445 A1 | 3/2004 | Burdon |
| 2004/0059473 A1 | 3/2004 | He |
| 2004/0066645 A1 | 4/2004 | Graf et al. |
| 2004/0072575 A1 | 4/2004 | Young et al. |
| 2004/0083038 A1 | 4/2004 | He |
| 2004/0145499 A1* | 7/2004 | Schmidt ................ G08G 5/025 340/947 |
| 2004/0160341 A1 | 8/2004 | Feyereisen et al. |
| 2004/0160364 A1 | 8/2004 | Regev |
| 2004/0181318 A1 | 9/2004 | Redmond et al. |
| 2004/0264549 A1 | 12/2004 | Hoole |
| 2005/0004748 A1 | 1/2005 | Pinto et al. |
| 2005/0052451 A1 | 3/2005 | Servantie |
| 2005/0126679 A1 | 6/2005 | Kim |
| 2005/0136625 A1 | 6/2005 | Henseler et al. |
| 2005/0150289 A1 | 7/2005 | Osborne |
| 2005/0174350 A1 | 8/2005 | Ridenour et al. |

(56) References Cited

U.S. PATENT DOCUMENTS

| | | |
|---|---|---|
| 2005/0200502 A1 | 9/2005 | Reusser et al. |
| 2005/0225481 A1 | 10/2005 | Bonthron |
| 2005/0230563 A1 | 10/2005 | Corcoran |
| 2006/0004497 A1 | 1/2006 | Bull |
| 2006/0097895 A1 | 5/2006 | Reynolds et al. |
| 2006/0098452 A1 | 5/2006 | Choi et al. |
| 2006/0164284 A1 | 7/2006 | Pauplis et al. |
| 2006/0167967 A1 | 9/2006 | Bocko et al. |
| 2006/0215265 A1 | 9/2006 | Miyatake et al. |
| 2006/0227012 A1 | 10/2006 | He |
| 2006/0244636 A1 | 11/2006 | Rye et al. |
| 2006/0245171 A1 | 11/2006 | Kim et al. |
| 2006/0290253 A1 | 12/2006 | Yeo et al. |
| 2006/0290531 A1 | 12/2006 | Reynolds et al. |
| 2007/0001897 A1 | 1/2007 | Alland |
| 2007/0002078 A1 | 1/2007 | He et al. |
| 2007/0008214 A1 | 1/2007 | Wasiewicz |
| 2007/0013575 A1 | 1/2007 | Lee et al. |
| 2007/0018887 A1 | 1/2007 | Feyereisen et al. |
| 2007/0032951 A1 | 2/2007 | Tanenhaus et al. |
| 2007/0060063 A1 | 3/2007 | Wright et al. |
| 2007/0146364 A1 | 6/2007 | Aspen |
| 2007/0171094 A1 | 7/2007 | Alter et al. |
| 2007/0176794 A1 | 8/2007 | Feyereisen et al. |
| 2007/0179684 A1 | 8/2007 | He |
| 2007/0228586 A1 | 10/2007 | Merrill et al. |
| 2007/0247350 A1 | 10/2007 | Ryan |
| 2007/0279253 A1 | 12/2007 | Priest |
| 2007/0297736 A1 | 12/2007 | Sherman et al. |
| 2008/0018524 A1 | 1/2008 | Christianson |
| 2008/0051947 A1 | 2/2008 | Kemp |
| 2008/0074308 A1 | 3/2008 | Becker et al. |
| 2008/0111731 A1 | 5/2008 | Hubbard et al. |
| 2008/0145610 A1 | 6/2008 | Muller et al. |
| 2008/0180351 A1 | 7/2008 | He |
| 2008/0305721 A1 | 12/2008 | Ohashi et al. |
| 2009/0021397 A1* | 1/2009 | Wipf .................... G08G 5/0026 340/945 |
| 2009/0040070 A1 | 2/2009 | Alter et al. |
| 2009/0040772 A1 | 2/2009 | Laney |
| 2009/0046229 A1 | 2/2009 | Umemoto et al. |
| 2009/0148682 A1 | 6/2009 | Higuchi |
| 2009/0152391 A1 | 6/2009 | McWhirk |
| 2009/0153783 A1 | 6/2009 | Umemoto |
| 2009/0164067 A1 | 6/2009 | Whitehead et al. |
| 2009/0207048 A1 | 8/2009 | He et al. |
| 2009/0279030 A1 | 11/2009 | Toyama et al. |
| 2009/0279175 A1 | 11/2009 | Laney et al. |
| 2010/0033499 A1 | 2/2010 | Gannon et al. |
| 2010/0103353 A1 | 4/2010 | Yamada |
| 2010/0297406 A1 | 11/2010 | Schaffer et al. |
| 2010/0312428 A1 | 12/2010 | Roberge et al. |
| 2010/0312461 A1 | 12/2010 | Haynie et al. |
| 2011/0037616 A1* | 2/2011 | Leutelt .................... G01S 3/808 340/901 |
| 2011/0054729 A1 | 3/2011 | Whitehead et al. |
| 2011/0075070 A1 | 3/2011 | Kitagawa et al. |
| 2011/0141405 A1 | 6/2011 | Kitagawa et al. |
| 2011/0165361 A1 | 7/2011 | Sherman et al. |
| 2011/0184594 A1 | 7/2011 | Manfred et al. |
| 2011/0273325 A1 | 11/2011 | Goldman |
| 2011/0282580 A1 | 11/2011 | Mohan |
| 2011/0304479 A1* | 12/2011 | Chen .................... G08G 5/0021 340/951 |
| 2012/0053831 A1 | 3/2012 | Halder |
| 2012/0150426 A1 | 6/2012 | Conway |
| 2012/0174445 A1 | 7/2012 | Jones et al. |
| 2012/0215410 A1 | 8/2012 | Mcclure et al. |
| 2013/0041529 A1 | 2/2013 | He et al. |
| 2015/0211883 A1* | 7/2015 | He .................... G05D 1/0858 340/946 |
| 2016/0131739 A1 | 5/2016 | Jinkins et al. |

FOREIGN PATENT DOCUMENTS

| | | | |
|---|---|---|---|
| EP | 0 556 351 B1 | 6/1995 | |
| EP | 0 962 752 A1 | 12/1999 | |
| GB | 0 814 744 A | 6/1959 | |
| GB | 1092821 A * | 11/1967 | .......... G01S 13/913 |
| IT | WO 2009133102 A1 * | 11/2009 | .......... G01S 13/003 |
| JP | 01-210328 | 8/1989 | |
| JP | 05-200880 | 8/1993 | |
| JP | 05-293895 | 11/1993 | |
| JP | 06-051484 | 2/1994 | |
| JP | H08-220547 A | 8/1996 | |
| JP | 09-057779 | 3/1997 | |
| JP | 10-156853 | 6/1998 | |
| JP | 10-244589 | 9/1998 | |
| JP | 2000-141388 | 5/2000 | |
| JP | 2004-233590 | 8/2004 | |
| JP | 2004-354645 | 12/2004 | |
| JP | 2006-218658 | 8/2006 | |
| JP | 2006-334912 | 12/2006 | |
| JP | 2006-348208 | 12/2006 | |
| JP | 2007-206559 | 8/2007 | |
| JP | 2007-302398 A | 11/2007 | |
| JP | 2008-238607 | 1/2008 | |
| WO | WO-93/05634 | 3/1993 | |
| WO | WO-2011/089474 A2 | 7/2011 | |

OTHER PUBLICATIONS

Brailovsky et al., REVS122: A Radar-Based Enhanced Vision System for Degraded Visual Environments, Proc. of SPIE vol. 9087 908708-1, retrieved from the internet at http://proceedings.spiedigitallibrary.org on Jun. 25, 2014, 13 pages.

Federal Aviation Administration, Advisory Circular AC 90-106, "Enhanced Flight Vision Systems", initiated by AFS-400, dated Jun. 2, 2010, 55 pages.

Federal Aviation Administration, Aeronautical Information Manual (AIM) Basic Flight Information and ATC Procedures, dated Jul. 24, 2014, 2 pages.

Fountain, J.R., Digital Terrain Systems, Airborne Navigation Systems Workshop (Digest No. 1997/169), IEE Colloquium, pp. 4/1-4/6, Feb. 21, 1997.

Honeywell, RDR-4B Forward looking windshear detection / weather radar system user's manual with radar operating guidelines, Rev. 6, Jul. 2003, 106 pages.

Johnson, A., et al., Vision Guided Landing of an Autonomous Helicopter in Hazardous Terrain, Robotics and Automation, 2005. ICRA 2005. Proceedings of the 2005 IEEE International Conference, pp. 3966-3971, Apr. 18-22, 2005.

Kuntman, D., Airborne system to address leading cause of injuries in non-fatal airline accidents, ICAO Journal, Mar. 2000, 4 pages.

Skolnik, Introduction to Radar Systems, McGraw Hill Book Company, 2001, 3 pages.

Skolnik, Radar Handbook (McGraw Hill Book Company), 1990, 23 pages.

Technical Standard Order, TSO-C115b, Airborne Area Navigation Equipment Using Multi-Sensor Inputs, Department of Transportation, Federal Aviation Administration, Sep. 30, 1994, 11 pages.

Vadlamani, A., et al., Improving the detection capability of spatial failure modes using downward-looking sensors in terrain database integrity monitors, Digital Avionics Systems Conference, 2003. DASC-03. The 22nd, vol. 2, pp. 9C.5- 91-12 vol. 2, Oct. 12-16, 2003.

Wang et al., A Simple Based on DSP Antenna Controller of Weather Radar, 2001 CIE International Conference, 4 pages.

"MountainScope™ on a TabletPC," PCAvionics™, printed from website www.pcavionics.com on Aug. 28, 2007, 1 page.

TAWS Class A and Class B, Terrain Awareness and Warning Systems, Universal® Avionics Systems Corporation, Sep. 2007, 6 pages.

"TAWS Terrain Awareness and Warning System," Universal® Avionics, printed from website www.uasc.com on Aug. 28, 2007, 2 pages.

(56) References Cited

OTHER PUBLICATIONS

Adams, Charlotte, "Synthetic Vision: Picturing the Future," Avionics magazine, Oct. 1, 2006, printed from website www.aviationtoday.com, 4 pages.
Adams, Charlotte, "Synthetic Vision: Picturing the Future," Avionics magazine, Solutions for Global Airspace Electronics, Oct. 2006, cover and pp. 22-29.
Blue Mountain Avionics' Products, printed from website www.bluemountainavionics.com on Aug. 28, 2007, 4 pages.
Carter, S. P., D. D. Blankenship, M. E. Peters, D. A. Young, J. W. Holt, and D. L. Morse (2007), Radar-based subglacial lake classification in Antarctica, Geochem. Geophys. Geosyst., 8, 003016, doi:10.1029/2006GC001408, 20 pages.
G2000, Garmin, printed from website https://buy.garmin.com/shop/shop.do?cID=153&pID=97668 on Jun. 28, 2011, 2 pages.
G3000, Garmin, printed from website https://buy.garmin.com/shop/shop.do?cID=153&pID=66916 on Jun. 28, 2011, 2 pages.
G5000, Garmin, printed from website https://buy.garmin.com/shop/shop.do?cID=153&pID=90821&ra=true on Apr. 20, 2011, 2 pages.
Office Action in Japanese Patent Application 2015-116688, dated Aug. 25, 2015, 4 pages.
Office Action in Japanese Patent Application 2015-116716, dated Aug. 25, 2015, 3 pages.
Office Action with English Translation received in Korean Patent Application 10-2010-7017278, dated Aug. 26, 2015, 5 pages.
Pictures of DELPHINS, printed from website www.tunnel-in-the-sky.tudelft.nl on Aug. 28, 2007, 4 pages.
Restriction Requirement for U.S. Appl. No. 13/867,556, mail date Dec. 26, 2013, 6 pages.
REVS Product Information Sheet, Sierra Nevada Corporation, dated May 7, 2014, 2 pages.
Synthetic Vision System, en.wikipedia.org/wiki/Synthetic_vision_system, retrieved Feb. 28, 2013, 4 pages.
Van Kasteren, Joost, "Tunnel-in-the-Sky, Synthetic vision simplifies the pilot's job and enhances safety," printed from website www.delftoutlook.tudelft.nl on Aug. 28, 2007, 13 pages.
Walker, GD-Itronix Dynavue Technology, The Ultimate Outdoor-Readable Touch-Screen Display, Rugged PC Review, 4 pages.
U.S. Appl. No. 14/841,558, filed Aug. 31, 2015, Rockwell Collins, Inc.
First Office Action of Korean Patent Application No. 10-2016-7013740, dated Sep. 19, 2016, 7 pages.
McGray et al., Air Operators, Airlines, Manufacturers and Interested Industry Stakeholders & Aero Chart Forum-Utilizing EFVS technology and incorporating it into FAA NextGen, Federal Aviation Administration, Apr. 23 & 30, 2014, 34 pages.

* cited by examiner

SYSTEM FOR AND METHOD OF RADAR DATA PROCESSING FOR LOW VISIBILITY LANDING APPLICATIONS

CROSS-REFERENCE TO RELATED PATENT APPLICATIONS

The present application is related to U.S. patent application Ser. No. 13/247,742 filed on Sep. 28, 2011, U.S. patent application Ser. No. 11/851,323 filed on Sep. 6, 2007, U.S. patent application Ser. No. 11/904,491 filed on Sep. 26, 2007, U.S. patent application Ser. No. 13/241,051, U.S. patent application Ser. No. 12/263,282 and U.S. patent application Ser. No. 12/180,293 all of which are herein incorporated by reference in their entirety and assigned to the assignees of the present application.

BACKGROUND

The present disclosure relates generally to aircraft sensing and/or display systems. The present disclosure more specifically relates to an apparatus and method for the detection and/or display of runways and/or runway features using radar.

Displays are used in head down display (HDD) systems, head up display (HUD) systems including but not limited to wearable displays such as helmet mounted display (HMD) systems. In aircraft applications, HUD and HDD systems advantageously display information from aircraft systems and sensors in a graphical and alphanumeric format. The display information can include an enhanced vision image from a camera or other imaging sensor (such as a visible light imaging sensor, infrared imaging sensor, millimeter wave radar imager, or combinations thereof) and/or a synthetic vision image from a synthetic vision computer in certain applications. The enhanced vision image can be merged with a synthetic vision image to provide a single image to the pilot. The image can further contain or be augmented by alphanumeric and iconic symbology that highlights or enhances the image content.

Enhanced flight vision systems (EFVSs) are often utilized to view the runway during the approach or landing phases. Infrared cameras and light sensors used by conventional enhanced vision systems can have a limited ability to penetrate certain challenging weather conditions, such as CAT III fog and heavy precipitation. For example, infrared-based systems can have difficulty detecting and displaying runways in low visibility conditions (e.g., under 300 feet runway visual range (RVR)).

Enhanced flight vision systems have been proposed which use radio frequency (RF) signals such as millimeter wave (mmW) radar and/or weather radar signals (X-band, K-band, etc.). RF signals are better able to penetrate challenging weather conditions. However, conventional use of RF signals often deliver images of lower resolution when compared to infrared-based cameras and light sensors. Various weather radar systems are described in the applications incorporated herein by reference.

FAA-certified enhanced flight vision systems can allow pilots landing under instrument flight rules to operate below certain specified altitudes during instrument approaches even when the airport environment is not visible. Conventional SVS cannot provide enhanced flight visibility, especially the capability to show a real world sensed image of the runway during an impending landing. Although SVS has been approved for flying an instrument approach procedure, SVS has not been approved for operations below authorized decision height (DH) or minimum descent altitude (MDA). The use of an integrity monitor for a SVS may allow for higher design assurance levels which could lead to the use of monitored SVS for lower landing minimum credit (e.g., would allow a pilot with a monitored SVS display system to land where a non-monitored SVS pilot would not be otherwise allowed to land due to the current low visibility or RVR restrictions). Accordingly, there have been proposals to provide a monitor for an SVS system based upon various instruments. The use of additional equipment to provide an integrity monitor for the SVS can add to the cost and weight of the aircraft.

Accordingly, there is a need for systems for and methods of detecting runway features using radar data and/or displaying images (e.g. runway features) derived from radar data. There is still a further need for systems for and methods of providing real time symbols or images derived from weather radar data. Yet further, there is a need for a HUD including runway symbology or icons derived from radar data. There is also a need for a system for and method of providing an integrity check for an SVS without use of additional systems. There is also a need for systems for and methods of detecting a runway or taxiway and its orientation in challenging weather conditions. There is also need to aid detection and display of runway features using weather radar.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to an apparatus for use with an aircraft radar system having a radar antenna. The apparatus includes processing electronics configured to receive radar data associated with signals associated with the radar antenna and to detect periodic data associated with runway lights in the radar data.

Another exemplary embodiment relates to a method of using radar return data from a radar system on an aircraft. The method includes receiving the radar return data from the radar system, identifying a spatial pattern associated with a set of runway lights in the radar return data, and providing image data including a representation of the runway lights identified using the spatial pattern associated with the radar return data.

Another embodiment relates to an apparatus for use of the weather radar system. The apparatus includes means for receiving weather radar data. The apparatus also includes means for identifying runway lights from the weather radar data.

BRIEF DESCRIPTION OF THE DRAWINGS

The disclosure will become more fully understood from the following detailed description, taken in conjunction with the accompanying drawings.

DETAILED DESCRIPTION OF THE EXEMPLARY EMBODIMENTS

Figure 1:
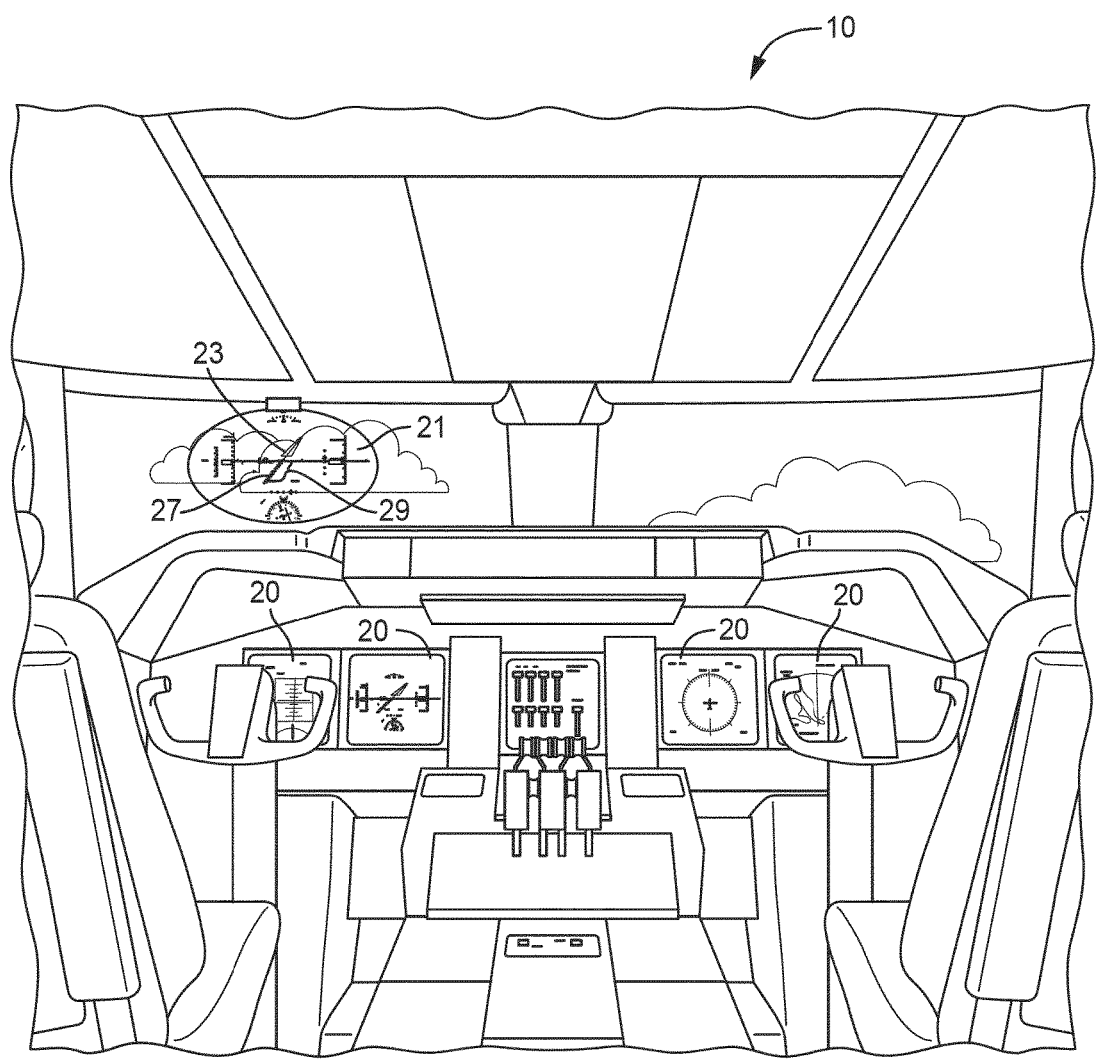
FIG. 1 is a schematic illustration of an aircraft control center or cockpit, according to an exemplary embodiment.

Before describing in detail the particular improved system and method, it should be observed that the invention includes, but is not limited to, a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

According to certain exemplary embodiments, a radar system, such as, a weather radar system, can be used to detect features of a runway environment. In one embodiment, features having a high radar cross-section (RCS) are utilized to detect features associated with the runway. For example, metal stanchions that support the Approach Light System (ALS) can be identified in radar data associated with scans of the runway. In another embodiment, metal content of embedded runway center lines and edge lights can be identified in the radar data. Utilizing the high radar cross section associated with metal content of runway lighting advantageously allows detection to be achieved whether at day or night, regardless of whether runway lights are on or are off.

In one embodiment, the runway features can exhibit unique, accurate, prescribed characteristics. The characteristics are unique when compared to non-runway terrain features. For example, the spacing and location (the spatial frequency) of the features can be specified with very high accuracy according to Federal Aviation Administration (FAA) and International Civil Aviation Organization (ICAO) standards, rules and specifications.

Systems and methods can be provided which detect characteristics of runway features using runway lights disposed in various patterns. According one example, runway centerline lights are spaced at 50-foot intervals. See "Aeronautical Information Manual Official Guide to Basic Flight Information and ATC Procedures, Federal Aviation Administration," Jul. 24, 2014. According to another example, runway touchdown zone lights are provided for runways intended for precision approach Category II or III operations. Runway touchdown zone lights extend from the threshold for a distance of 900 m in a pattern formed by pairs of barrettes symmetrically located about the runway center line. Each barrette consists of three light units at 1.5 m apart. The first pair of barrettes are located at 60 m from the threshold, and subsequent barrettes are spaced longitudinally at 60 m apart according to one example. According to another example, runway center lights are placed at longitudinal intervals of 60 m. According to another example, lights for a precision approach Category II and III lighting system include row of lights on the extended centerline of the runway extending, wherever possible, over a distance of 900 m from the runway threshold. In addition, the system will have two side rows of lights, extending 270 m from the threshold, and 5 crossbars, at 150 m, 300 m, 450 m, 600 m and 750 m from the threshold. In another example, a precision landing system includes the lights forming the centerline placed at longitudinal intervals of 30 m with the innermost light located 30 m from the threshold. See, CHAPTER 7: VISUAL AIDS FOR NAVIGATION-LIGHTS, aai.aero/aai_employees/chapter_7.pdf. Embodiments are not limited to any of the specific examples given above or any particular standards, specifications, rules, or governing bodies.

In one embodiment, the systems and methods take advantage of regular, periodic, equal spacing nature of visual aids such as ALS lights, runway turn off and turn on lights, taxi way lights, edge lights, and center line lights. The strict definition associated with the spacing of such visual aids which by design are very specific to air field environment can be used to uniquely identify runways on approach and taxi ways while maneuvering on the ground in one embodiment. In one embodiment, Fourier transforms or the related techniques, such as, discrete cosine transform (DCT) functions, etc., can be used to detect or assist detection of the periodic pattern.

In certain embodiments, the systems and methods can be utilized as extension to focal plane array-based (FPA-based) enhanced flight vision systems, as an extended center line generators using sensing rather than navigation extracted center lines, as basic building blocks of a combined vision system (CVS) as an alignment confirmation tool for a synthetic vision system solution thereby providing higher reliability for the SVS, or as an enabler for a lower minimum minima for low visibility operations.

Referring to FIG. 1, an illustration of an aircraft control center or cockpit 11 is shown, according to one exemplary embodiment. Aircraft control center 11 includes flight displays 20 embodied as head down displays (HDDs). Aircraft control center 11 can also include a combiner 21 association with a head up display (HUD) system. In one embodiment, combiner 21 is provided as part of a wearable HUD. Conformal images are provided on combiner 21.

Flight displays 20 can be used to provide information to the flight crew, thereby increasing visual range and enhancing decision-making abilities. In an exemplary embodiment, flight displays 20 and combiner 21 can include a weather display, a joint display, a weather radar map and a terrain display. Further, flight displays 20 may include images from a synthetic vision system (SVS) or an enhanced vision system (EVS) (e.g., an EFVS). For example, flight displays 20 can include a display configured to display a three dimensional perspective image of terrain and/or weather information. Other view of terrain and/or weather information may also be provided (e.g., plan view, horizontal view, vertical view, or combinations thereof). Additionally, flight displays 20 can be implemented using any of a variety of display technologies, including CRT, LCD, organic LED, dot matrix display, and others.

According to an exemplary embodiment, at least one of displays 20 or combiner 21 is configured to provide an image of a runway 23 or features associated with runway 23 (e.g., during approach and landing) or taxiway (e.g., while taxiing). In one embodiment, at least one of displays 20 or combiner 21 displays a merged image of terrain derived from two or more of enhanced vision data, radar data, and SVS data. Advantageously, real time radar data can be provided to provide real time, all weather detection of runway features associated with runway 23 in one embodiment. Advantageously, identification of the orientation of runway 23 using the radar data allows runway 23 and its orientation to be sensed in challenging weather conditions in one embodiment.

In one embodiment, a symbol or icon for runway 23 can be provided on displays 20 or combiner 21. A set of runway features such as ALS lights 29 or other runway lights, can be indicated on displays or combiner 21. In one embodiment, an extended runway center line 27 is provided on displays 20 or combiner 21. The placement of extended runway center line 27 is determined at least in part from the detection of runway features using radar data.

Flight displays 20 and/or combiner 21 can be configured to provide an indication to a flight crew as to whether the terrain features associated with the radar data and/or SVS data displayed on the electronic display are correct or incorrect. In one embodiment, such an indication notifies the crew if the integrity of the SVS is sufficient, possibly for lower authorized decision heights and minimum descent altitudes in low visibility conditions.

Figure 2:
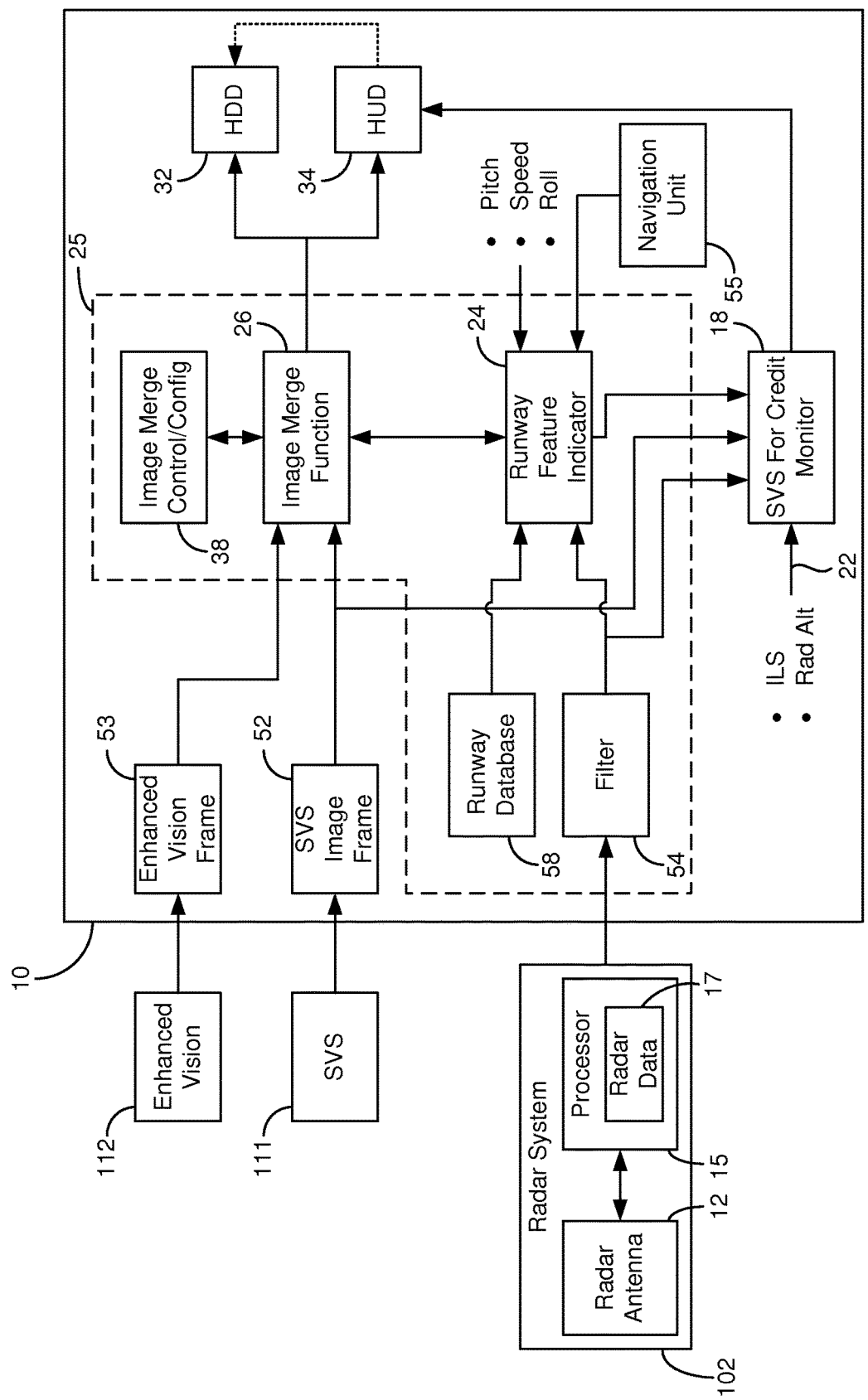
FIG. 2 is a schematic general block diagram of a display system for displaying an image or symbols derived from radar data, according to an exemplary embodiment.

Referring to FIG. 2, display system 10 can be utilized for providing an image to any of displays 20 or combiner 21. Display system 10 is in communication with a radar system 102, enhanced vision system (EVS) 112 and a synthetic vision system (SVS) 111. EVS 112 and SVS 111 are optional. Display system 10 includes a memory 53 for storing enhanced vision frame from EVS 112, a memory 52 for storing enhanced vision frame from SVS 111, a filter 54, a runway feature identifier 24, an image merge module 26, and an image merge control/configuration module 38.

Filter 54, runway feature identifier 24, image merge module 26, and image merge control/configuration module 38 can be embodied as software modules operating on a computing platform or processor 25 and can be stored on a non-transitory medium. Processor 25 can be part of or integrated with radar system 102, SVS 111, EVS 112, HDD display computer 32, or HUD computer 34 in certain embodiments. In one embodiment, processor 25 is an independent platform.

Radar system 102 is preferably a weather radar system generally located inside the nose of the aircraft, inside a cockpit of the aircraft, on the top of the aircraft or on the tail of the aircraft. Radar system 102 can include a radar antenna 12 and a processor 15. Radar system 102 is can be a weather radar system, such as, a Multiscan™ radar system from Rockwell Collins, Inc. Radar system 102 can utilize a split or half aperture or other technique for obtaining radar data associated with terrain in one embodiment. The type of radar system 102 and data gathering techniques are not discussed in the specification in a limiting fashion.

Radar system 102 includes a computer system or processor 15 including radar data storage unit 17 in one embodiment. Processor 15 receives radar returns (e.g., weather radar returns data) from radar antenna 12, processes the radar returns and provides data stored in radar data storage unit 17. The data stored in storage unit 17 preferably includes an image frame representing the data from a radar scan of the Earth's surface (e.g., near a runway).

Radar system 102 provides radar data (e.g., weather radar data) in storage unit 17 to filter 54 in one embodiment. Alternatively, processor 25 can build the frame or image based upon radar return data from system 102. Similarly, SVS 111 can provide data or a frame for SVS image received by memory 52. Alternatively, system 10 can provide the data or image frame to memory 52 in response to data from SVS 111.

In one embodiment, radar system 102 preferably provides data representing a 120 degree field of view in accordance with a weather radar sweep which takes approximately five seconds to complete in one embodiment. The sweep can be limited during approach to be a 30 degree sweep which requires five seconds before new data is available for display in certain embodiments. The sweep is directed toward the surface of the Earth so that returns are obtained which allow runway features to be detected. Various types of sweeps, scans and timings of sweeps and scans can be utilized without departing from the scope of the invention.

In one embodiment, radar system 102 is an RF Sensor of an alternative type. For example, non-weather radar sensors or other RF Sensors can be utilized as system 102. In one embodiment, radar system 102 embodied as a weather radar allows existing avionic equipment to be used as a precise runway detector as described below.

According to one embodiment, SVS 111 can be any electronic system or device for providing a computer generated image of the external scene topography. The image can be from the perspective of the aircraft flight deck as derived from aircraft attitude, high-precision navigation solutions, and a database of terrain, obstacles and relevant cultural features. Generally, only those terrain, obstacle, and runway features which are contained in the current version of the SVS database are displayed in a conventional system. The pilot uses the synthetic vision images as enhancements to available visual cues.

According to one embodiment, EVS 112 can be any electronic system or device for providing a sensed image of the external scene topography. EVS 112 can be an infrared camera in one embodiment.

System 10 combines or fuses images from SVS 111 or EVS 112 and the representations of runway features derived from radar data from system 102 to provide an overall image provided to the pilot according to one embodiment. The images are fused in a format that integrates features of SVS 111, EVS 112 and the representation of the runway features from radar data from system 102 in one embodiment. In one embodiment, the representations of runway features are fused with HUD symbology for display on combiner 21.

SVS 111 can include a terrain database and a processor according to one exemplary embodiment. The terrain database can be used to create a three-dimensional perspective of the scene in front of the aircraft on a two-dimensional display or a three dimensional display. The terrain database can employ topographical colors similar to those depicted on standard aeronautical charts. Furthermore, the terrain database is capable of detecting segments of image data corresponding to various objects in the computer generated image such as runways, terrain and sky.

SVS 111 can also receive aircraft position data from an aircraft data source, such as, the source used by runway feature identifier 24 or other equipment. The aircraft data source can include any system or sensor (or combination thereof) that provides navigation data or aircraft flight parameters. For example, a typical navigation system in an aircraft has numerous sub-systems. Sub-systems which provide aircraft position data and flight parameter data could include, but are not limited to, an inertial navigation system (INS), a global navigation satellite system (e.g., global positioning system (GPS)), air data sensors, compasses, and a flight management computer (FMC).

In one embodiment, filter 54 processes the radar data for identification of runway features. For example, filter 54 can be embodied as a Fourier transform, a discrete cosine transform (DCT), a spatial frequency filter, a pattern matching filter, for detecting periodic patterns associated with features of the runway in radar data stored in storage unit 17. According to one embodiment, a Fourier transform of the radar data in storage unit 17 has extremely high values at the spatial frequency associated with light barrette installations and/or other high radar cross-section features and provides strong confirmation of alignment to a runway or taxi way as identified by a runway feature identifier 24. Proper design of filter 54 can ensure detection of these spatial frequencies as they happen in a rotation-invariant and scale-invariant fashion. The threshold for radar returns can be set relatively high to eliminate returns that are not from high radar-cross section objects in one embodiment.

In one embodiment, the Fourier transform can be performed on the radar data in storage unit 17 in the plan position indicator (PPI) domain. In one embodiment, the radar data in the PPI domain is filtered before perspective transformation into C-scope domain. Alternatively, the transform can be performed on the C-scope transformation of the radar data taking into account perspective compression with elevation. In one embodiment, the transform can be set to the expected spatial frequencies of runway light features. Alternatively, the PPI domain radar data can be used directly for comparison to a PPI-like SVS solution, thereby altogether obviating the need for processing the radar data into a C-scope domain.

Runway feature identifier 24 can utilize the processed or filtered data from filter 54 to identify particular runway features. The runway features can be identified by comparing patterns with reference patterns stored in a runway data base 58 for such features. The data base 58 can also store expected spatial frequencies for filter 54. The particular patterns can be chosen utilizing a location parameter from a navigation unit 55. For example, the runway light pattern for particular airports and approaches can be stored in data base 58. Runway feature identifier 24 can utilize roll, pitch, and speed of the aircraft to adjust the patterns before comparing to stored patterns. The reference patterns can be stored as mathematical representations, in a look-up table, as a video frame, etc. In one embodiment, longitudinal patterns, lateral patterns or both lateral and longitudinal patterns can be detected. All runway approach lighting systems in typical modern installations fall into few possible spacing categories, so that a detection of a runway may not use an explicit database of runway features in one embodiment.

Runway feature identifier 24 can provide data for icons or symbols for merger or provision on displays 20 or combiner 21 via HUD computer 34 or heads down display computer 32. The symbols can be dashes, circles, or other indications of the presence of runway lights in one embodiment.

In one embodiment, data for runway feature symbols are provided directly to HUD computer 32 or HDD display computer 32 for providing indications on displays 20 or combiner 21. In another embodiment, the data for runway feature symbols can be provided to image merge function module 26. Image merge function module 26 receives an EVS frame from memory 53 or an SVS frame from memory 52 and merges the data for runway feature symbols to appropriately display an EVS image or an SVS image with the runway feature symbols.

Processor 25 preferably executes a fusion processing algorithm in module 26 for fusing the frames from memory 52, memory 53, and identifier 24 provided as video signals. This fusion process may include special formatting (positioning, sizing, cropping, etc.) of specific features or the entire image from a specific image source based on other sensor inputs or aircraft. After the combined or fused image has been completed, the entire image is sized to fit appropriately within the total HUD field-of-view and conformally overlay the outside scene, which is viewed through combiner 21 of the HUD. In addition, the overall fused image contrast is standardized with the brightness/contrast to support the brightness/contrast controls of the HUD.

Precise localization of the exact spacing of runway light locations in actual physical distance units (e.g., 100 feet, 200 feet) can allow exact and very reliable confirmation of ALS light detection via filter 54 in one embodiment. In one embodiment, localization of the pattern of runway lights allows accurate measurement in the longitudinal location of the aircraft with respect to the runway. Accurate longitudinal location is particularly advantageous for pilots because judging longitudinal location from perspective imagery such as imagery from focal-plane based enhanced flight vision systems or C-scope transform can be difficult.

In one embodiment, filter 54 or runway feature identifier 24 can utilize additional techniques such as beam sharpening (e.g., horizontal beam sharpening) and deconvolution of the beam point spread function. Such additional techniques allow more accurate extrapolation from the center of each detected barrette or runway light for extended runway centerline 27 (FIG. 1). Even runways with most basic ALS systems, such as, a 1400 foot Medium Approach Light System with Runway Alignment Indicator Lights (MALSR), can be detected using radar data processed by filter 54. Extended runway center line 27 can be extracted using a very precise line fit using filter 54 and runway feature identifier 26. Extended runway center line 27 can even be extracted in the presence of some lateral direction uncertainty. A Hough transform or statistical regression can be utilized to reduce lateral uncertainty. In one embodiment, radar system 102 can use beam sharpening as a process that improves the antenna-induced poor angular resolution (e.g., due to the beam width). There are many methods that can be used such as: Doppler Beam Sharpening, Synthetic Aperture Radar (SAR), Monopulse Radar, Sub-Aperture Radar or Split-Aperture Radar, etc. Mathematical methods can be utilized to determine a center of the radar echo for identifying runway features.

System 10 can also include a SVS for credit monitor 18 in one embodiment. SVS for credit monitor 18 can receive data from EVS 112, SVS 111, and radar system 102 to determine position accuracy for SVS 111. Monitor 18 can also receive signals from various aircraft sensors including integrated landing system (ILS), radio altimeters, an inertial navigation system (INS) and/or other sensors. Monitor 18 can provide an indication of the result of an integrity check for display via HDD display computer 32 and HUD computer 34.

Runway feature identifier 24 can provide data associated with the location of runway lights to confirm alignment for the SVS solution of SVS 111. The confirmed alignment derived from radar data can effectively be used in credit monitor 18 for HUD computer 34, thereby allowing the use of lower landing minima in SVS 111 without EVS according to one embodiment. Advantageously, runway location derived from weather radar data that can effectively see through weather condition provides an effective real time runway location solution.

In one embodiment, the runway data in the terrain database of SVS 111 can be compared to the runway location derived from radar data from system 102 to confirm accuracy. Various matching algorithms can be utilized to determine if the solutions provided by the SVS and runway feature identifier 24 are accurate. If the compare function indicates that there is not a match, a monitor 18 indicates that lower minimum approaches are not to be allowed as there may be a database error or error with system 102 or SVS 111. The indication can be provided on combiner 21 associated with HUD computer 34 or on displays 20.

Applicants believe that use of monitor 18 and system 10 may assist in a reduction of minimum from a 200 foot decision height to a 100 foot for SVS 111, or lower, due to the high design assurance and integrity brought about by the comparison of the information from multiple independent subsystems. An additional benefit of the system may also be for use in low visibility taxi scenarios.

Image control configuration module 38 can provide format adjustments to data. SVS 111 and system 102 can have their own specific interface type and format. Also, each display of displays 20 and combiner 21 may require specific formatting. A standard format can be a format used in HUD processing functions. Module 38 can be implemented in hardware, software, or combinations thereof.

Figure 3:
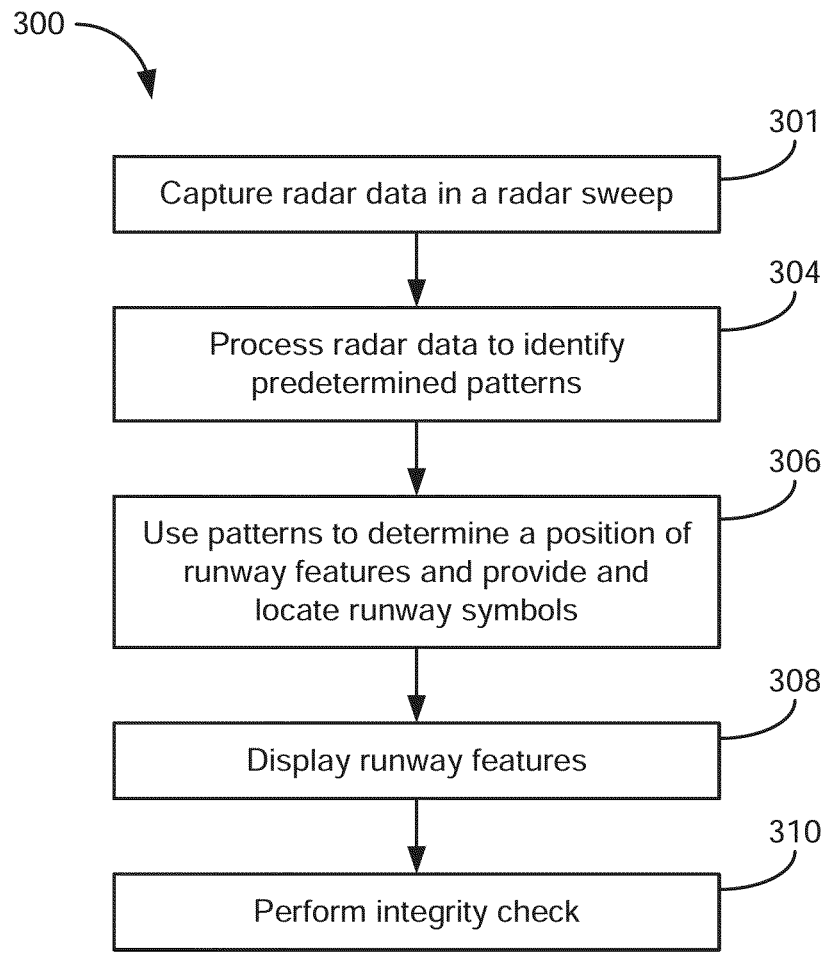
FIG. 3 is a flow diagram showing an exemplary process used by the system illustrated in FIG. 2, according to a further exemplary embodiment.

With reference to FIG. 3, a flow 300 can be performed by system 10 for runway identification and display of runway data in one embodiment. At an operation 301, radar system 102 captures radar data in a radar sweep. At an operation 304, the radar data is processed to identify pre-determined patterns. As discussed above, filtering or related techniques by filter 54 can be utilized to identify pre-determined patterns.

At an operation 306, the patterns are used to determine a position of runway features and appropriately provide and locate runway symbols. The runway symbols can include runway light symbols (e.g., set of lights 29) and extended centerline 27 in one embodiment.

At an operation 308, runway features are displayed on a display via a display computer such as HUD display computer 32 or HUD computer 34. At an operation 310, credit monitor 118 can use the determined locations associated with the runway features to perform an integrity check associated with the SVS data in memory 52. After operation 310, flow 300 can return to operation 301.

Processor 25 can be any hardware and/or software processor or processing architecture capable of executing instructions and operating on navigational and radar data. Processor 25 can be capable of determining navigational information such as altitude, heading, bearing, and location based on data from aircraft sensors. Applicants note that flow 300 and runway identification can be performed in various equipment on the aircraft including in a HUD computer, a display processor, radar system 102, a navigation system, SVS 111, etc. in accordance with an exemplary embodiment.

Figure 4:
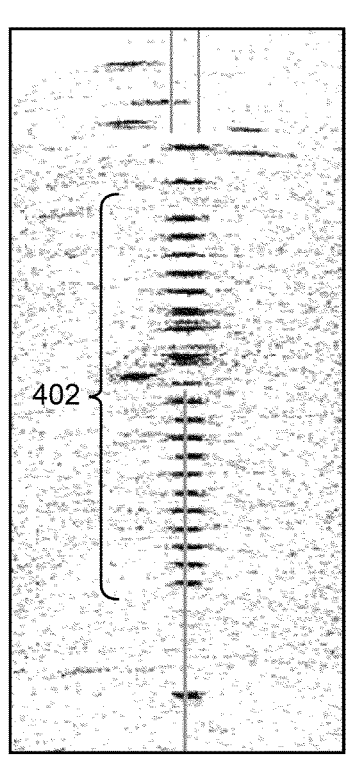
FIG. 4 is an illustration of a radar image data associated with runway lights.
Figure 5:
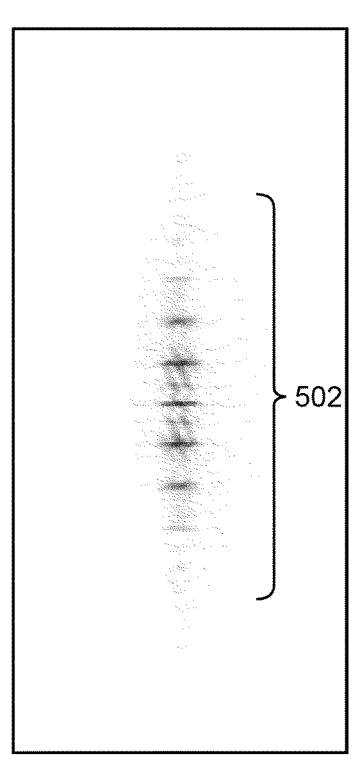
FIG. 5 is an illustration of the radar image illustrated in FIG. 4 processed to identify characteristic spatial frequency of the runway lights.

With reference to FIG. 4, a representation 400 of radar data (e.g., radar image data) associated with storage unit 17 includes regular return patterns 402 associated with runway lights. With reference to FIG. 5, radar data associated with representation 400 is processed to provide processed radar data shown as representation 500 including a pattern 502. The processing can be performed by filter 54 and removes returns that are not associated with a pattern of runway lights in one embodiment. In one embodiment, the processed radar data associated with representation 500 is a Fast Fourier Transform of the radar data associated with representation 400 in the PPI domain. Advantageously, the FFT is translation invariant in one embodiment (e.g. representation 500 of the runway lights does not change as the approach progresses). A matched filter to the spatial frequency of the runway lights can be constructed to indicate that an airfield is in sight in one embodiment. When such a match filter indicates that the airfield is in sight, runway feature identifier 24 can provide an indication to HUD computer 34 or HDD display computer 32 such that an indication is provided on displays 20 or combiner 21 in one embodiment.

Figure 6:
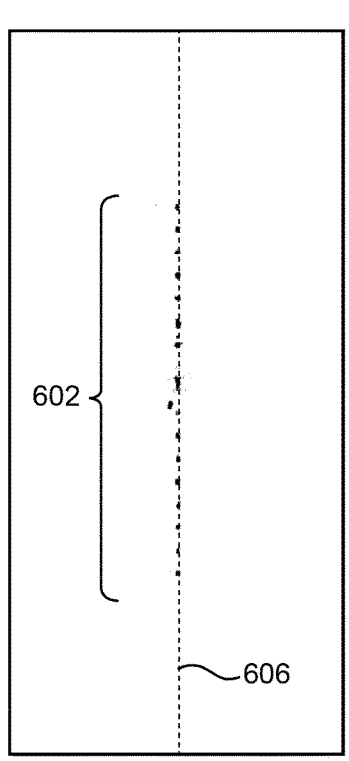
FIG. 6 is an illustration of the radar image data illustrated in FIG. 4 processed to provide a runway extended center line according to yet another exemplary embodiment.

With reference to FIG. 6, a representation 600 of the radar data associated with representation 400 includes a set of indications 602 of runway lights. The radar data is thresholded and beam sharpened to obtain the data associated with representation 600. An extended runway centerline 606 can be extrapolated using a best fit technique. A one eighth horizontal scale can be utilized in one embodiment.

Figure 7:
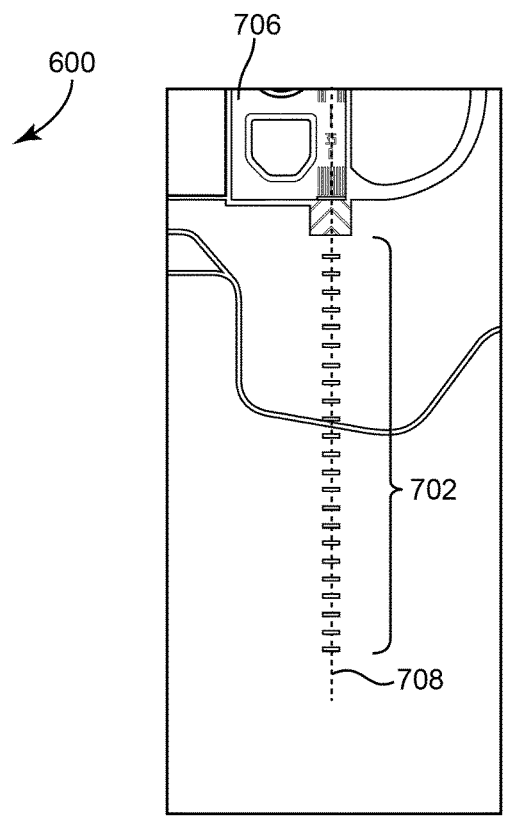
FIG. 7 is an illustration of a terrain image including symbols for the runway associated with the runway image data illustrated in FIG. 4 according to another exemplary embodiment.

With reference to FIG. 7, a merged representation 700 of terrain data from SVS 111, runway features 702 from the radar data and an extended runway center line 708 extrapolated from runway features 702 is provided on one or more of displays 20. In one embodiment, representation 700 without terrain data including a representation of runway 706 and runway features 702 and extended centerline 708 is provided on combiner 21.

Features 702 representing runway lights can be provided appropriately on the terrain data. Features 702 can be placed using the data associated with representations 500 or 600. Extended runway center line 708 can be extrapolated with good accuracy from a best fit of the centroids of each radar return in one embodiment. Alternative, symbology can be utilized for runway features 702 or extended centerline 708. In addition, a matching algorithm can be utilized to determine whether features 702 derived from the radar data are at the same location as the symbols associated with the terrain data base. Such matching can be used to monitor SVS functionality and to lower landing minimum. In one embodiment, runaway features 702 can be represented as set of dashes or cross-bars, where each dash has a width corresponding to lateral uncertainty of the location of the runway feature. Alternatively, the average lateral uncertainty for the set can be used as the width for each dash. Extended centerline 708 can be used to determine lateral alignment with positioning and data associated with SVS 111.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. For example, the scope of the claims are intended to cover any technique that uses a selectable fractional aperture unless literally delineated from the claims. Furthermore, other substitutions, modifications, changes, and omissions may be made in the design, operating conditions, and arrangement of the exemplary embodiments without departing from the scope of the invention as expressed in the appended claims.

What is claimed is:

1. An apparatus for use with an aircraft radar system having a radar antenna, the apparatus comprising:
   a runway database configured to store a reference pattern for runway lights; and
   processing electronics configured to receive radar data associated with signals associated with the radar antenna and to detect periodic data in the radar data, the periodic data being associated with a potential indication of returns from the runway lights in the radar data, wherein the periodic data is compared to the reference pattern to confirm locations of the runway lights.

2. The apparatus of claim 1, wherein the apparatus and processing electronics utilize beam sharpening to provide an improved angular resolution of the radar data.

3. The apparatus of claim 2, wherein the radar antenna is a weather radar antenna and the radar data is from a weather radar system.

4. The apparatus of claim 1, further comprising a display configured to provide an image, the image including a representation of the runway lights detected by the processing electronics.

5. The apparatus of claim 4, wherein the image is conformally provided onto a combiner of a head up display system.

6. The apparatus of claim 1, wherein the runway lights comprise runway edge lights, runway centerline lights, touch down zone lights, runway end identification lights, or approach lighting system lights.

7. The apparatus of claim 1, wherein the processing electronics comprises a filter for filtering the radar data to detect the periodic patterns.

8. The apparatus of claim 7, wherein the filter is a Fourier transform filter.

9. The apparatus of claim 1, wherein the runway lights are approach lighting system lights spaced at a distance of 200 feet or 100 feet.

10. A method of using radar return data from a radar system on an aircraft, the method comprising:
    receiving the radar return data from the radar system;
    identifying a spatial pattern associated with a set of the runway lights in the radar return data;
    comparing the spatial pattern associated with the set of the runway lights in the radar return data to a known spatial pattern for the set of the runway lights; and
    providing image or symbolic data including a representation of the runway lights identified using the radar return data.

11. The method of claim 10, wherein the known spatial pattern is derived from runway data in a terrain database.

12. The method of claim 11, further comprising:
    using correlation of the spatial pattern associated with the set of the runway lights in the radar return data to the known spatial pattern for the set of the runway lights to enable a lower minima approach.

13. The method of claim 12, further comprising:
    using the correlation to indicate an error.

14. The method of claim 13, further comprising:
    displaying of an image on an electronic display associated with the image data.

15. The method of claim 14, wherein the electronic display is a head up display and the identifying step is performed in a head up display computer, a weather radar system, a synthetic vision system, or a display computer.

16. The method of claim 12, wherein the identifying uses a filter to identify the spatial pattern associated with the runway lights.

17. A method of using radar return data from a radar system on an aircraft, the method comprising:
    receiving the radar return data from the radar system;
    identifying a spatial pattern associated with a set of the runway lights in the radar return data; and
    providing image or symbolic data including a representation of the runway lights identified using the radar return data; and
    using statistical regression or a Hough transform to reduce lateral uncertainty associated with lateral position of the runway lights.

18. An apparatus for use with a weather radar system, the apparatus comprising:
    means for receiving weather radar data; and
    means for identifying runway lights from the weather radar data, wherein statistical regression or a Hough transform is used to reduce lateral uncertainty of locations of the runway lights.

19. The apparatus of claim 18, wherein the weather radar data is generated using beam sharpening comprising a monopulse technique, a sub-aperture radar technique, deconvolution of a beam point spread function, or any combination thereof.

20. The apparatus of claim 18, further comprising a display, wherein the runway lights are represented as dashed lines on the display, wherein each of the dashes has a width associated with the lateral uncertainty.

* * * * *